(12) United States Patent
Sprachmann et al.

(10) Patent No.: US 7,202,188 B2
(45) Date of Patent: Apr. 10, 2007

(54) LEAD- AND BARIUM-FREE CRYSTAL GLASS

(75) Inventors: Gerold Sprachmann, Kolsassberg (AT); Johannes Maier, Innsbruck (AT)

(73) Assignee: D. Swarovski & Co., Wattens (AT)

( * ) Notice: Subject to any disclaimer, the term of this patent is extended or adjusted under 35 U.S.C. 154(b) by 0 days.

(21) Appl. No.: 11/522,311

(22) Filed: Sep. 18, 2006

(65) Prior Publication Data

US 2007/0032367 A1   Feb. 8, 2007

Related U.S. Application Data

(63) Continuation of application No. PCT/AT05/000083, filed on Mar. 9, 2005.

(30) Foreign Application Priority Data

Mar. 19, 2004  (AT) ................ A 484/2004

(51) Int. Cl.
*C03C 3/093* (2006.01)
*C03C 3/095* (2006.01)

(52) U.S. Cl. .......................... 501/67; 501/64
(58) Field of Classification Search ........... 501/67, 501/64
See application file for complete search history.

(56) References Cited

U.S. PATENT DOCUMENTS

| 2,433,883 | A |   | 1/1948 | Armistead |         |
|-----------|---|---|--------|-----------|---------|
| 5,434,111 | A | * | 7/1995 | Clement et al. | 501/63 |
| 6,184,166 | B1| * | 2/2001 | Hares et al. | 501/72 |
| 6,391,810 | B1|   | 5/2002 | Lenhart |         |

FOREIGN PATENT DOCUMENTS

WO     00/09456     2/2000

* cited by examiner

*Primary Examiner*—Karl Group
(74) *Attorney, Agent, or Firm*—Wenderoth, Lind & Ponack, L.L.P.

(57) ABSTRACT

A lead- and barium-free crystal glass having a refractive index of at least 1.55, with in % by weight, more than 50% and less than 60% $SiO_2$, more than 0.6% and less than 4% $B_2O_3$, less than 3% $K_2O$, more than 12% and less than 15% $Na_2O$, more than 4% and less than 11% CaO, more than 0.25% and less than 5% $Al_2O_3$, less than 2% MgO, and between 8 and 16% ZnO, with the proviso that the total content of the oxides of Pb, Ba and As is below 0.1%, the total content of the oxides of Ti and La is below 5% and the total content of the oxides of Nb, Ta, Yb, Y, W, Bi and Zr is below 5%, wherein at most 1% oxides of Nb, Ta and Yb respectively and 3% of the oxides of Y, W, Bi and Zr respectively are included.

6 Claims, No Drawings

LEAD- AND BARIUM-FREE CRYSTAL GLASS

This application is a Continuation Application of International application No. PCT/AT2005/000083, filed Mar. 9, 2005.

The invention relates to a lead- and barium-free crystal glass having a refractive index of at least 1.55, with in % by weight more than 50% $SiO_2$, more than 0.6% and less than 4% $B_2O_3$, less than 3% $K_2O$, more than 12% and less than 15% $Na_2O$, more than 4% and less than 11% CaO, more than 4.5% ZnO, more than 0.25% and less than 5% $Al_2O_3$, less than 5% $TiO_2$ and less than 2% MgO.

As lead is toxic to the human body the use of that material is increasingly rejected even where it is undoubtedly harmless from the point of view of natural sciences. That applies in particular also to the use of PbO in valuable glasses for decorative and utility articles, which use has been usual for centuries for achieving a high refractive index.

In recent years numerous proposals have been put forward for achieving at least the optical properties of crystal glass even without the use of lead or barium. In that respect the general kind of glasses, as defined in the opening part of this specification, is distinguished in that the content of sodium substantially exceeds that of potassium as in that way a high level of chemical resistance on the part of the glass is guaranteed and it can be categorised in a low hydrolytic class.

In particular a glass of the general kind set forth was disclosed in EP 1 074 522 (Example 2). That known glass has an $SiO_2$ content of 66.8%. In order nonetheless to arrive just at the minimum value of n=1.55 that glass contains a total amount of $TiO_2$ and $La_2O_3$ which usually results in glasses with a yellow tinge. Because of the high arsenic content moreover the known glass does not meet the requirement of avoiding all constituents which are toxic in themselves.

The invention is based on the surprising realisation that it is possible in comparison with the state of the art set forth to achieve a substantial increase in the refractive index, which is correspondingly more significant, the more the content of $SiO_2$ is reduced below 60% and at the same time the content of ZnO is increased above 8%.

DE-B 808 754 (Example 3) discloses a barium-free glass for the production of multifocal spectacle lenses, which has contents of 50% $SiO_2$ and 12% ZnO. That glass however has a content of 10% $ZrO_2$ which in accordance with the teaching of the prior publication can be reduced only by the use of $TiO_2$ or BaO. For utility glasses, a glass with a high content of $ZrO_2$ would not only be excessively expensive in itself, but the high processing temperature would additionally considerably increase the costs of the finished product.

A barium-free glass is considered for decorative and utility articles only if the contents of both $TiO_2$ and $ZrO_2$ are low. It was surprisingly found that it is possible to achieve the desired refractive index if a glass of the kind defined in the opening part of this specification is characterised by contents of less than 60% $SiO_2$ and 8–16% ZnO, with the proviso that the total content of the oxides of Pb, Ba and As is below 0.1%, the total content of the oxides of Ti and La is below 5% and the total content of the oxides of Nb, Ta, Yb, Y, W, Bi and Zr is below 5%, wherein at most 1% oxides of Nb, Ta and Yb respectively and 3% of the oxides of Y, W, Bi and Zr respectively are included.

The low total content of the oxides of Pb, Ba and As corresponds in that respect to the object which is to be attained by the invention. The limitation in terms of the total content of the oxides of Ti and La arises out of the object of increasing the refractive index without worsening transmission.

A particular advantage of the invention is that it makes it possible to dispense with further toxic and/or expensive constituents. Oxides of Nb, Ta, Yb, Y, W, Bi and Zr should therefore be added only to such an extent as is required by a higher refractive index which is if need be sought to be achieved.

The effect of ZnO in the context according to the invention is similar to that of CaO, and for that reason particularly good results are achieved if the total content of ZnO and CaO is over 15%.

Strontium enjoys a low level of significance in itself in terms of glass engineering so that the use thereof in the context of the invention is in no way necessary. As its properties are similar to those of CaO however CaO can be partially replaced by SrO if the costs which are about ten times are accepted.

A real improvement in the context of the basic concept of the invention is achieved by the use of $Li_2O$. If it is used in an amount of at least 0.5% the melting and processing temperature of the glass is reduced. In that respect, in spite of the content of alkalis, which in any case is already high, the hydrolytic class is not worsened, at least not when the total of $Na_2O$ and $Li_2O$ is below 17%.

Further constituents (for example SnO) can also be provided in small amounts, but they are undesirable in themselves, for which reason it is more appropriately provided that the total content of all other constituents, apart from purifying agents such as $Sb_2O_3$ and decoloration agents such as $Nd_2O_5$ and $Er_2O_3$ is below 2%.

Set forth hereinafter are three embodiments by way of example which are embraced within the scope of the invention.

| Example 1 | | Example 2 | | Example 3 | |
|---|---|---|---|---|---|
| Oxides: | % by wt | Oxides: | % by wt | Oxides: | % by wt |
| $SiO_2$ | 59.68 | $SiO_2$ | 58.94 | $SiO_2$ | 50.94 |
| $B_2O_3$ | 2.99 | $B_2O_3$ | 2.99 | $B_2O_3$ | 2.99 |
| $K_2O$ | 2.00 | $K_2O$ | 1.99 | $K_2O$ | 1.00 |
| $Na_2O$ | 13.47 | $Na_2O$ | 13.45 | $Na_2O$ | 13.45 |
| $Li_2O$ | 1.00 | $Li_2O$ | 2.00 | $Li_2O$ | 2.00 |
| CaO | 6.50 | CaO | 6.00 | CaO | 10.00 |
| MgO | 0.72 | MgO | 0.72 | MgO | 0.72 |
| ZnO | 9.00 | ZnO | 9.00 | ZnO | 15.00 |
| $Al_2O_3$ | 0.42 | $Al_2O_3$ | 0.42 | $Al_2O_3$ | 2.42 |
| $Y_2O_3$ | 2.00 | $ZrO_2$ | 2.00 | $TiO_2$ | 0.99 |
| $TiO_2$ | 2.00 | $TiO_2$ | 1.99 | $Sb_2O_3$ | 0.50 |
| $Sb_2O_3$ | 0.22 | $Sb_2O_3$ | 0.50 | | |
| Density: | 2.71 | Density: | 2.72 | Density: | 2.82 |
| Refractive index: | 1.553 | Refractive index: | 1.560 | Refractive index: | 1.571 |

The foregoing examples are arranged on the basis of falling weight of $SiO_2$. It is readily apparent that the density and the refractive index increase therewith. It is particularly noticeable that the best optical properties were achieved with a composition which entirely dispensed with the oxides of Nb, Ta, Yb, Y, W, Bi and Zr (Example 3). At the same time the content of titanium oxide in that example was also kept so low that transmission is constant in the entire visible range and a yellow tinge is avoided thereby. That positive result is to be attributed to the high content of ZnO in conjunction with the also high content of CaO.

The invention claimed is:

1. A lead- and barium-free crystal glass having a refractive index of at least 1.55, with in % by weight
   more than 50% and less than 60% $SiO_2$,
   more than 0.6% and less than 4% $B_2O_3$,
   less than 3% $K_2O$,
   more than 12% and less than 15% $Na_2O$,
   more than 4% and less than 11% CaO,
   more than 0.25% and less than 5% $Al_2O_3$,
   less than 2% MgO,
   between 8 and 16% ZnO,
   with the proviso that
   the total content of the oxides of Pb, Ba and As is below 0.1%,
   the total content of the oxides of Ti and La is below 5% and
   the total content of the oxides of Nb, Ta, Yb, Y, W, Bi and Zr is below 5%,
   wherein at most 1% oxides of Nb, Ta and Yb respectively and 3% of the oxides of Y, W, Bi and Zr respectively are included.

2. A crystal glass according to claim 1 wherein the total content of ZnO and CaO is over 15%.

3. A crystal glass according to claim 1 wherein CaO is partially replaced by SrO.

4. A crystal glass according to claim 1 additionally containing 0.5–3.0% $Li_2O$.

5. A crystal glass according to claim 4 wherein the sum of $Na_2O$ and $Li_2O$ is below 17%.

6. A crystal glass according to claim 1 wherein the total content of all other constituents apart from purifying agents such as $Sb_2O_3$ and decoloration agents such as $Nd_2O_5$ and $Er_2O_3$ is below 2%.

* * * * *